March 17, 1959 W. E. LANHAM 2,877,883
BREAD HANDLING APPARATUS
Filed April 10, 1956 2 Sheets-Sheet 1
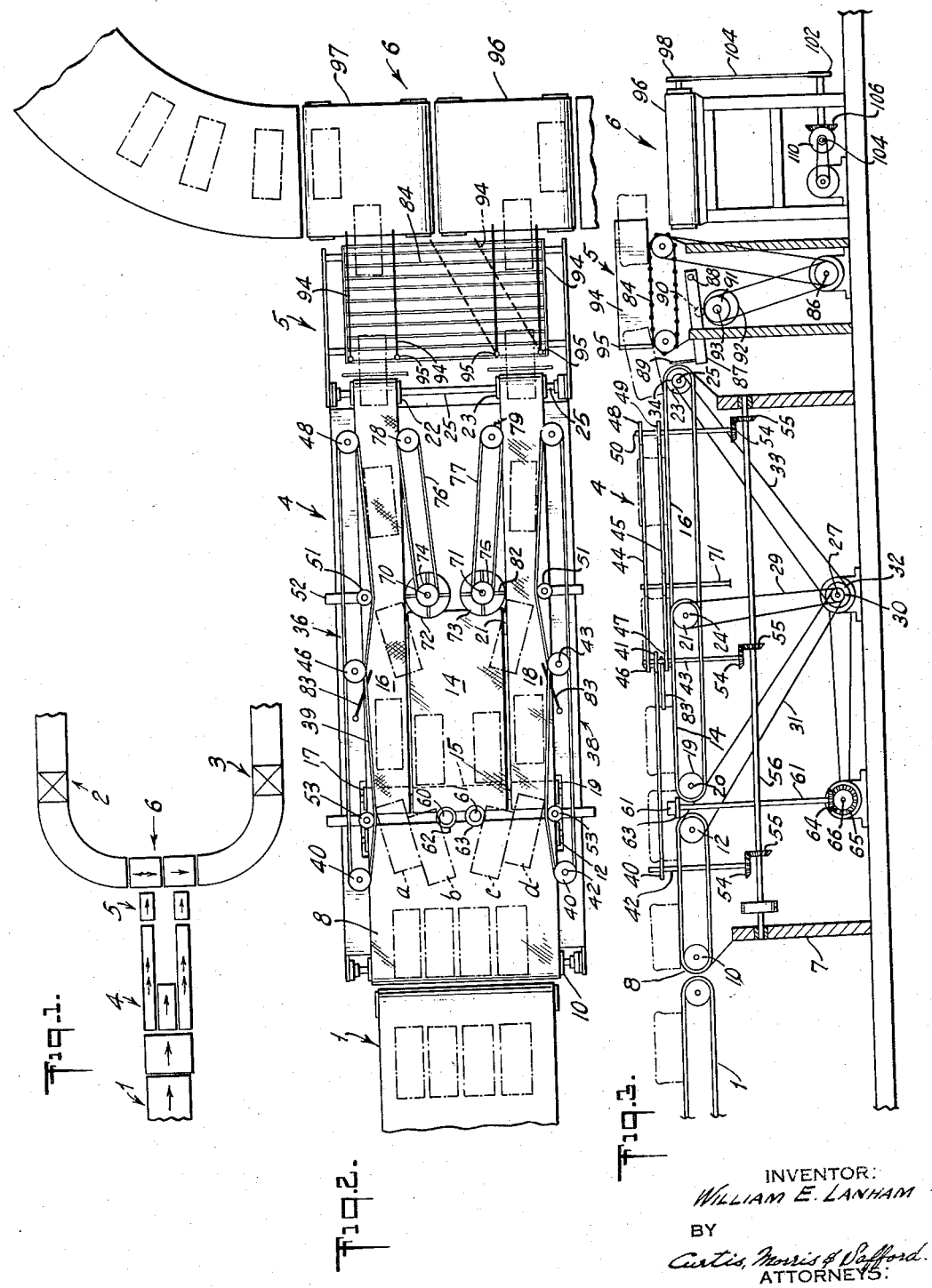
INVENTOR:
WILLIAM E. LANHAM
BY
Curtis, Morris & Safford.
ATTORNEYS March 17, 1959 W. E. LANHAM 2,877,883
BREAD HANDLING APPARATUS
Filed April 10, 1956 2 Sheets-Sheet 2
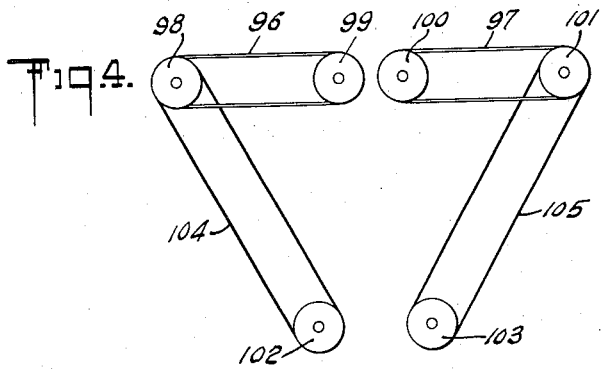
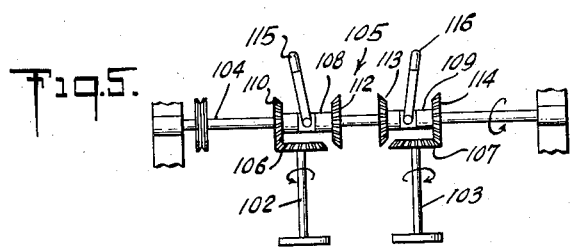
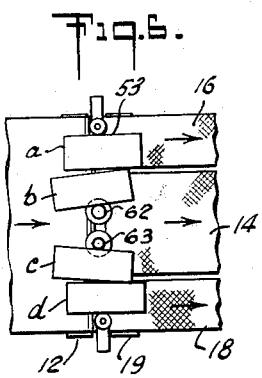
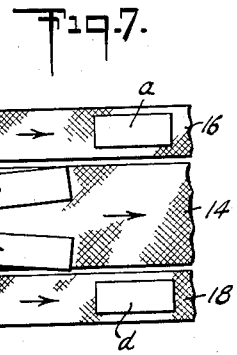
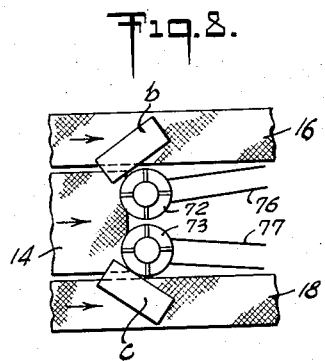
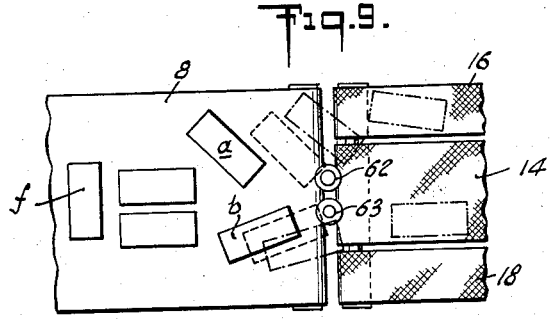
INVENTOR:
WILLIAM E. LANHAM
BY
Custer, Morris & Safford
ATTORNEYS United States Patent Office 2,877,883
Patented Mar. 17, 1959

2,877,883

BREAD HANDLING APPARATUS

William E. Lanham, Atlanta, Ga.

Application April 10, 1956, Serial No. 577,340

18 Claims. (Cl. 198—32)

The present invention relates to a method of and apparatus for handling bread or similar bakery products, and more particularly to a conveyor arrangement for delivering loaves of bread from one processing apparatus to another.

Baked bread removed from an oven must be cooled before it can be properly sliced or wrapped. One method of procedure is to depan the bread onto a conveyor belt immediately after removal from the oven, and then manually transfer the loaves from the conveyor onto open racks. The racks are progressively moved through a room or other enclosure where the bread gradually cools as it moves therethrough. The racks of cooled bread are then delivered to a slicing and wrapping machine where an attendant transfers the loaves from the rack to the machine. Such a method of procedure is inefficient, time consuming, and requires considerable amount of manual transfer.

Preferably, the loaves of bread are cooled in the manner described and claimed in my prior application for United States Letters Patent, Serial No. 534,682, filed September 16, 1955, and entitled "Bread Cooling System," now Patent No. 2,758,391. The mode of procedure with such apparatus is to depan the bread as it is removed from the oven onto a conveyor. This may be done by bumping an inverted pan against a bumper stop which causes the bread loaves to fall from the pans into a chute which reverses them to an upright position on the conveyor. Thus, a number of loaves, depending upon the number of pans which are strapped together, are laid in substantially parallel spaced relationship on the conveyor. The conveyor moves in a continuous spiral until the bread is cooled. The cooled bread is delivered to a machine for slicing and wrapping. With the bread cooling apparatus described above, the loaves are delivered from the cooling apparatus in regular spaced parallel arrangement, such as, for example, four abreast. With other methods of cooling or handling, the loaves may be delivered for slicing and/or wrapping in a haphazard manner.

One of the objects of the present invention is to provide a method of and bread-handling apparatus for rearranging the loaves of bread as they are conveyed from one processing apparatus such as a cooler to another processing apparatus such as a slicing and wrapping machine. A further object is to provide a bread-handling apparatus of the type indicated, which is thoroughly practical and efficient in operation, requiring a minimum of labor. A further object is to provide a bread-handling apparatus for rearranging and conveying the loaves without crushing or otherwise damaging the loaves. A further object is to provide for the above with apparatus which is relatively easy to manufacture and maintain, and which is adaptable to a great variety of conditions of installation and operation which are encountered in different bakeries throughout the country. A further object is to provide a thoroughly practical construction of the above character which may be operated without the need for constant attention by skilled personnel, and which will maintain steady and reliable operation, whereby the loaves of bread from a cooling apparatus are continuously conveyed in proper alignment and in spaced relation to a slicing and wrapping machine.

These and other objects will become more apparent from the following description and drawings in which like reference characters denote like parts throughout the several views. It is to be expressly understood, however, that the drawings are for the purpose of illustration only, and are not a definition of the limits of the invention, reference being had for this purpose to the appended claims.

In the drawings:

Figure 1 is a plan view of a bread handling apparatus for conveying loaves of bread from one processing apparatus to another and incorporating the novel features of the present invention;

Figure 2 is an enlarged plan view of the bread handling apparatus and showing the manner in which the loaves are rearranged from a parallel to an in-line relationship;

Figure 3 is a side elevational view of the bread-handling apparatus and showing the driving means for operating the conveyor belts at different rates of speed;

Figure 4 is an end elevational view of the transverse conveyors and showing the driving means for operating the conveyors in opposite directions;

Figure 5 is a plan view of a reversing gear mechanism for driving each transverse conveyor in either direction;

Figure 6 is a plan view of a portion of the bread-handling apparatus to show the relationship of one row of loaves just subsequent to their movement from the position illustrated in Figure 2;

Figure 7 is a view similar to Figure 6 showing the relationship of the loaves after a further increment of forward movement;

Figure 8 is a view similar to Figures 6 and 7, showing the loaves on the inner conveyor belt being directed outwardly between loaves on the outer belt; and, Figure 9 is a plan view of a portion of the bread-handling apparatus and showing the manner in which two loaves of bread delivered to the conveyor in an irregular arrangement are rearranged into alignment.

As illustrated in Figures 1 to 3 of the drawings, the bread handling apparatus constituting the subject matter of the present invention is located between a delivery conveyor 1 from a cooling apparatus constituting one processing apparatus, and a pair of slicing and wrapping machines 2 and 3, constituting the other processing apparatus. The bread cooling apparatus and its conveyor are preferably of the type illustrated in my prior application Serial No. 534,582, now Patent No. 2,758,391, referred to above. The conveyor 1 delivers a plurality of bread loaves arranged lengthwise in spaced parallel relationship in a row extending transversely of the conveyor as, for example, four abreast. The bread slicing and wrapping machine may be of any conventional kind which receives the loaves sidewise one after another in a single line. The bread-handling apparatus comprises a system of conveyors having three units 4, 5 and 6 which receive the loaves in parallel arrangement, rearranges them into single lines of spaced loaves arranged lengthwise and then conveys them from the cooling apparatus to the slicing and wrapper apparatus in proper position for slicing.

The conveyor unit 4 of the bread handling apparatus comprises a frame 7 having a relatively wide wire-mesh conveyor belt 8 positioned closely adjacent the conveyor 1 of the cooling apparatus to receive the rows of loaves successively. Conveyor belt 8, as illustrated, is slightly wider than the conveyor 1 and moves slightly faster in the same direction to advance the loaves of bread received therefrom. Belt 8 is mounted on spaced rolls or drums 10 and 12 journaled on the frame 7. Also mounted on the frame 7 are endless wire-mesh conveyor belts 14, 16 and 18 having one of their ends positioned adjacent the discharge end of conveyor belt 8. Conveyor belt 14 is positioned centrally of the belt 8 and is of a width to support two loaves of bread. Belts 16 and 18 are each of a width to support a single loaf and are positioned at each side of the belt 14 and closely adjacent thereto. Belts 16 and 18 extend beyond and are about twice the length of the belt 14. Endless conveyor belts 14, 16 and 18 are supported at one end by rolls or drums 15, 17 and 19, loose on a shaft 20, and are supported at their opposite ends by driven rolls or drums 21, 22 and 23. These belts 14, 16 and 18 are preferably of wire mesh rather than canvas or otherwise because they present a low friction surface to the fragile bread loaves. Driven roll 21 is fast on a shaft 24 and driven rolls 22 and 23 are fast on a shaft 25.

The wire-mesh conveyor belt 14 is driven slightly faster than the wide conveyor belt 8, while the conveyor belts 16 and 18 at the sides of belt 14 are driven at a higher rate of speed, preferably about twice as fast as the speed of the belt 14. For example conveyor belt 14 may move at a rate of 50 feet per minute while conveyor belts 16 and 18 may move at a rate of 100 feet per minute. To this end, the shaft 24 for the conveyor belt 14 is driven from a power shaft 27, see Figure 3, by means of a belt 29. The driving means for the various driven shafts are defined as belts, but it will be understood that other driving means such as chains and sprockets can be used as well as belts and pulleys. Roll or drum 12 for driving the wire-mesh conveyor belt 8 is also driven from the power shaft 27 through pulley 30 and belt 31 to move the belt 8 at a slightly slower rate of speed than the conveyor 14. Shaft 25, on the other hand, is driven from the power shaft 27 through a larger pulley 32, belt 33 and small pulley 34 on the shaft 25.

Guide means 36 and 38 are provided at opposite sides of the bread handling apparatus adjacent the outside edge of the conveyor belts 16 and 18. As shown in Figure 3, each of the guide means 36 and 38 comprises a belt 39 mounted on pulleys 40 and 41 on vertically arranged shafts 42 and 43, respectively. A second pair of vertically spaced belts 44 and 45 are mounted for rotation on pulleys 46 and 47 on the vertical shaft 43 at one end, and on pulleys 48 and 49 on a vertical shaft 50 at their other ends. The belts 39, 44 and 45 are advantageously V-type in cross section, and the pulleys 40, 41, 44, 47, 48 and 49 are grooved to receive the belts. By reference to Figure 2, it will be observed that the inside runs of the belts 39, 44 and 45 are positioned to overlie the conveyor belts 16 and 18. The inner runs of belts 44 and 45 are pressed inwardly by idler pulleys 51 mounted on an adjustable bracket 52 and the inner runs of belts 39 are pressed inwardly by similar adjustable idler pulleys 53 to cause them to further overlie the side conveyor belts 16 and 18 at spaced points between the vertical shafts 42 and 50. Each of the vertical shafts 42, 43 and 50, at each side of the apparatus are mounted for rotation in suitable bearings on the frame 7 and driven by bevel gears 54 and 55. Bevel gears 54 are mounted on the ends of vertical shafts 42, 43 and 50, and the bevelled gears 55 are mounted on a shaft 56 journaled on the frame and driven in any suitable manner from the power shaft 27. The arrangement is such that the belts 39, 44 and 45 travel in the same direction and at about three times the rate of speed of the conveyor belt 14. The belts 39, 44 and 45 prevent the loaves of bread from being detained, and the portions of the belts 39, 44 and 45 pressed inwardly by the idler pulleys 51 and 53 tend to cause the belts to properly align the loaves on the conveyor belts 16 and 18.

Located centrally between the conveyor belts 8 and 14 are a pair of spaced vertically arranged shafts 60 and 61, having discs 62 and 63 at their upper end protruding above belts 8 and 14 in the path of movement of certain of the loaves of bread advancing on the conveyor belt 8. Shafts 60 and 61 are suitably journaled for rotation on the frame 7, and are driven from the power shaft 27 by beveled gears 64 and 65 at a relatively high rate of speed, see Figure 3. Disc 62 is slightly larger in diameter than disc 63 and hence runs at a slightly higher surface speed. Bevel gear 65 is mounted on a transverse shaft 66 which, in turn, is driven from the power shaft 27. The rotating discs 62 and 63 are for the purpose of directing loaves of bread advancing on the conveyor belt 8 to one side or the other of the apparatus. If a loaf of bread contacts both discs, disc 62, running at a higher surface speed and having a larger diameter gives a differential sidewise thrust to the loaf and pushes it onto belt 16.

Vertical shafts 70 and 71 similar to shafts 60, 61, are provided at the other end of the conveyor belt 14, and the shafts have discs 72 and 73 at their upper ends. The discs 72 and 73 of this pair, however, are of a larger diameter and extend from the center of the apparatus, over the end of conveyor belt 14 flush with its top surface and also flush with the inside edges of the side conveyor belts 16 and 18. Each vertical shaft 70 and 71 mounts a pulley 74 or 75 in addition to its disc 72 or 73 for guiding a V-belt 76 or 77. The opposite ends of the belts 76 and 77 ride in pulleys 78 and 79 located adjacent the conveyor belts 16 and 18, so that the V-belts 76 and 77 diverge from the discs 72 and 73 toward the conveyor belts 16 and 18. Vertical shafts 70 and 71 are driven by bevel gears 80 and 81 from the power shaft 27 in a manner similar to the shafts 60 and 61. Each of discs 72, 73 carries on its top face, which face is level with belt 14, the raised radially extending shoulders or cleats 82. These shoulders 82 are adapted to push the bread loaves sidewise toward belts 16 and 18 respectively.

In conjunction with belts 39, 44 and 45, discs 72, 73, and belts 14, 16, 18, a pair of adjustable guides 83 are positioned adjacent vertical shafts 43 to move the bread out of contact with belts 44 and 45. Thus if two loaves of bread try to enter between belts 44, 45 and 76, the outer loaf moves against a guide 83 while the inner loaf contacts disc 72 and is advanced thereby ahead of the outer loaf, the latter slipping on belt 16 until the inner loaf has passed.

Conveyor unit 5 is located adjacent the unit 4 adjacent the outer or discharge ends of the conveyor unit 4. Conveyor unit 5 comprises a frame mounting a conveyor belt 84 in alignment with but raised slightly above the tops of conveyor belts 16 and 18 of the unit 4. Preferably, the conveyor belt 84 is of the type illustrated and described in my prior application for United States Letters Patent, Serial No. 497,521, filed March 29, 1955, and entitled "Conveyor Belt." Conveyor belt 84 is driven from a power shaft 86 through a drive belt at a slightly higher rate of speed than the conveyor belts 16 and 18 with which it is aligned. For example, the belt 84 may be driven at a rate of 180 feet per minute.

An indexing mechanism also is provided between the conveyor belts 16 and 18 and belt 84 for intercepting the loaves of bread to insure proper spacing. The indexing mechanism comprises an arm 87, pivoted at one end at 88, and having a barrier 89 projecting at right angles from its other end. A cam follower 90 is provided intermediate the ends of the arm 87 which rides on a cam 91 having a lobe 92 for raising the abutment between the conveyor belts or adjacent units. Cam 91 is mounted on a cam shaft 93 rotatably mounted in the frame 83 and driven in timed relation with the belt 84 from the power shaft 86. The timing arrangement is such that when the barrier or abutment is depressed to permit a loaf of bread to move from the conveyor belt 16 or 18 to the conveyor belt 84, barrier 89 will remain depressed for a period of time to permit the passage of one loaf of bread. Immediately after the passage of a loaf of bread, the barrier 89 is raised by the cam lobe 92 to intercept and hold back the next loaf of bread if it is too close to the previous loaf for a period of time to produce the proper spacing after which it is again depressed. Thus, the indexing mechanism operates to properly space the loaves of bread as they move lengthwise in single lines onto conveyor belt 84.

After moving onto belt 84, the loaves are guided single file between the pairs of side barriers 94. These pairs of barriers are pivoted at 95 and are free to swing at their far ends so that the two lines of bread can be directed either to the right, the left or straight ahead on belt 84.

The third conveyor unit 6 is located at the end of the unit 5. Conveyor unit 6 comprises a frame having two conveyor belts 96 and 97 mounted thereon for movement in a direction transverse to the movement of the belt 84 of the intermediate unit 5. As illustrated in Figure 4, the conveyor belt 96 is mounted to travel on rolls or drums 98 and 99, while the belt 96 is mounted to travel on the rolls or drums 100 and 101, see Figure 4. Rolls 98 and 101 are driven from shafts 102 and 103 through belts 104 and 105. Shafts 102 and 103, in turn, are driven from a power shaft 104 through a reversing gear mechanism 105 for rotating the shafts 102 and 103 in either direction. As illustrated in Figure 5, the reversing gear mechanism comprises a bevelled gear 106 or 107 on each shaft 102 and 103, respectively, and a sleeve 108 or 109 for each shaft slidable on but keyed to the power shaft 104 and mounting bevel gears 110, 112 and 113, 114 at opposite ends, respectively. Sleeves 108 and 109 are operated by a shifting fork 115 and 116, respectively. When the sleeves 108 and 109 are in the position illustrated in Figure 5, the shafts 102 and 103 and the conveyor belts 96 and 97 move in opposite directions. By moving the sleeve 108 to the left as viewed in Figure 5 to engage bevel gear 112 with gear 106 both belts 96 and 97 will move toward the right. By moving the sleeve 109 to the right from the position illustrated in Figure 5 to engage the bevel gear 113 with the gear 107, the conveyor belts 96 and 97 will move toward the left.

It will be noted by reference to Figure 3, that the conveyor belt 84 of the intermediate conveyor unit 5 is located above the transverse conveyor belts 96 and 97. Due to the high speed of the belt 84 the loaves of bread are propelled lengthwise onto the conveyor belts 96 and 97 in regular spaced relation. The loaves are then conveyed sidewise in opposite directions to the slicing and wrapping machines 2 and 3, respectively. One embodiment of the invention having been described in detail, the mode of operation is explained below.

For purposes of description, let it be assumed that baked loaves of bread are being delivered from the cooling apparatus on the conveyor belt 1 in regular spaced rows of four loaves abreast, as illustrated in Figure 2. Each row of four loaves is delivered from conveyor 1 onto the conveyor belt 8 where the loaves advance in the manner illustrated. As the middle two loaves *b* and *c* advance, their forward ends engage the discs 60 and 61 rotating in opposite directions. Disc 60 turns the forward end of the loaf *b* in one direction, counter-clockwise, which, in turn, engages the next adjacent loaf *d*, and turns it at an angle, as illustrated in Figure 2. The outer forward corner of the loaf *a* ultimately engages the guiding belt 39 which tends to turn the loaf clockwise. This movement of loaf *a*, in turn, moves the forward end of the loaf *b* clockwise. The ultimate effect of these motions is to deliver the loaf *a* onto the high-speed conveyor belt 16 and direct the loaf *b* onto the low-speed conveyor belt 14 as shown more clearly in Figure 6. The disc 61 acts on the loaves *c* and *d* in the same way as explained with respect to the loaves *a* and *b*, but in the opposite direction to guide the loaf *d* onto the high-speed conveyor belt 18 and the loaf *c* onto the low-speed belt 14, see Figure 6. The loaves of a row then advance from the position illustrated in Figure 6 to that illustrated in Figure 7, at which time the loaves *a* and *d* are positioned lengthwise on the high-speed conveyor belts 16 and 18 and the loaves *b* and *c* are positioned on the belt 14 in an angular position in relation to the direction of the movement of the belt. Due to the difference in the speed at which the belts 16 and 18 move with respect to the belt 14, the loaves *a* and *d* move ahead of the loaves *b* and *c*, as illustrated in Figure 2.

As loaves *b* and *c* advance, their inner corners engage the rotating discs 72 and 73 and the shoulders 82 which guide the loaves in opposite direction, as illustrated in Figure 8. The disc 72 moves the forward end of loaf *b* outwardly toward the conveyor belt 16 simultaneously with its forward movement by the conveyor belt 14. In other words, loaf *b* follows the periphery of the disc 72 as it advances, causing it to be transferred from the low speed conveyor belt 14 to the high speed conveyor belt 16 between the loaves *a* of successive rows. The loaf *c* is directed outwardly by the disc 73 to transfer it from the conveyor belt 14 onto the conveyor belt 18 between loaves *d* of successive rows.

The V-belts 44 and 45, pressed inwardly by the idler pulleys 51 together with the belt 76 and 77 at each side of conveyors 16 and 18 tend to align the loaves lengthwise thereon. Idler pulley 51 is positioned so that the distance between it and pulley 74 or 75 is just large enough to pass one loaf of bread lengthwise. Similarly, the distance between idler 53 and disc 62 or 63 is such that two loaves can pass lengthwise when side-by-side. The line between belt 14 and 16 and between belt 14 and 18 are centered between idlers 53 and discs 62, 63. Thus when loaves *a* and *b* pass, loaf *a* will ride on belt 16 and loaf *b* on belt 14. It will now be apparent that unit 4 of the conveyor system rearranges the loaves from a lateral to a longitudinal alignment, or from lines of loaves four abreast to two lines in tandem.

The loaves advanced by the conveyor belts 16 and 18 of unit 4 are transferred single file to the higher speed conveyor belt 84 of the intermediate conveyor unit 5. If successive loaves are not properly spaced on conveyor belts 16 and 18 they engage the raised barrier 89 of the indexing mechanism. The barrier 89 holds a loaf for a period to insure proper spacing from the previous loaf after which the barrier is retracted.

The loaves of bread in each line are propelled forwardly by the high speed conveyor belt 84 onto transverse conveyors 96 and 97 where they are conveyed to their respective slicing and wrapping machines, 4 and 5. It is to be noted that the loaves are aligned lengthwise on the conveyor belts 16 and 18, so that, when propelled onto the transverse conveyors 96 and 97, they are arranged sidewise in the proper position to enter the slicing and wrapping machines.

When the bread is being baked at a rate which can be handled by one slicing and wrapping machine, the reversing mechanism 105 may be actuated to operate the transverse conveyor belts 96 and 97 in the same direction to feed all of the loaves to one slicing and wrapping machine. By operating the proper shifting fork 115 and 116, the bread may be advanced in either direction to one or the other of the machines 2 or 3.

Under some bread handling systems, the loaves may be delivered to the conveyor belt 8 in a haphazard, irregular arrangement, as illustrated in Figure 9. Rotating discs 62 and 63, however, will guide the loaves into a spaced aligned relationship in the same way as when the loaves are delivered in successive rows. By reference to Figure 9, it will be observed that the forward edge of a loaf *a* will engage the disc 62 and be turned through the progressive positions illustrated by dotted lines onto the conveyor belt 16. Loaf *b* which is more nearly aligned with its direction of movement will be turned through the progressive positions illustrated by dotted lines onto the conveyor belt 14. After the initial alignment, the loaves will either be positioned on the fast-moving conveyor belts 16 and 18, or on the slow-moving conveyor belt 14. Those loaves on the conveyor belt 14 engage the discs 72 and 73, and are guided onto the side belts 16 and 18 in the manner as previously explained. Thus, it will be seen that the bread-handling apparatus of the present invention operates to rearrange the loaves regardless of the arrangement in which they are received for delivery to a slicing and wrapping machine in their proper position, one after the other. When loaf f in Figure 9 advances sideways against both of discs 62, 63, it will be pushed to the left by the larger disc 62 onto belt 16 in the way previously explained.

It will now be observed that the present invention provides a bread-handling apparatus for changing the arrangement of the loaves of the bread from one order to another as they are conveyed from one processing apparatus, such as a cooling means, to another apparatus, such as a slicing and wrapping means. It will also be observed that the bread-handling machine automatically conveys loaves of bread from a cooling apparatus to a wrapping machine, and rearranges the alignment of the loaves without crushing, or otherwise damaging the bread. It will still further be observed that the present invention also provides a bread-handling apparatus of the type indicated, which is of simple and compact construction, adapted for economical manufacture and installation, and one which is reliable in operation.

While a preferred embodiment of the invention is herein illustrated and described, it will be understood that modifications may be made in the construction and arrangement of elements without departing from the spirit or scope of the invention. Therefore, without limitation in this respect, the invention is defined by the following claims.

I claim:

1. Bread handling apparatus for rearranging loaves of bread from a side-by-side to an in line relationship while being conveyed from one processing apparatus to another comprising, in combination, a first conveyor of a width to support a plurality of loaves received simultaneously from one processing apparatus, separate conveyors arranged in side-by-side relationship in alignment with and constituting a continuation of the first conveyor, said first conveyor delivering loaves onto said separate conveyors simultaneously, means for driving said separate conveyors at different rates of speed, means for directing loaves from the slower of said separate conveyors onto and between spaced loaves on the faster of said separate conveyors after traveling a predetermined distance on the slower conveyor to provide a single line of loaves on the faster conveyor, means cooperating with said faster conveyor to align the loaves lengthwise on said conveyor in a continuous row, a third conveyor in line with the faster conveyor for receiving the line of loaves therefrom, and means for driving the third conveyor at a faster speed than the conveyor from which it receives loaves to increase the spacing between loaves in the line.

2. Bread handling apparatus for rearranging loaves of bread from a side-by-side to an in line relationship while being conveyed from one processing apparatus to another comprising, in combination, separate conveyors arranged in side by side relationship, means for driving said separate conveyors at different rates of speed, means for delivering a plurality of loaves of bread to said conveyors simultaneously, means cooperating with said conveyors to direct loaves laterally, from the slower to the faster moving conveyor after traveling a predetermined distance on the slower conveyor to position the loaves from the last named conveyor between successive loaves on the faster moving of said separate conveyors, and an indexing mechanism operated in timed relation with said faster moving conveyor for intercepting the loaves thereon to properly space them in the line.

3. Bread handling apparatus for arranging loaves of bread in a predetermined spaced alignment while conveying it from one place to another comprising, in combination, a conveyor for supporting a plurality of loaves of bread received simultaneously, separte conveyors arranged in side-by-side relationship in alignment with and constituting a continuation of the first conveyor, said first conveyor delivering the plurality of loaves of bread onto one or the other of said separate conveyors, means for driving one of the separate conveyors at a faster rate than the other, means cooperating with the slower moving of said separate conveyors for directing loaves therefrom to the faster moving conveyor between successive loaves thereon, means at each side of the faster moving conveyor for aligning the loaves in a row thereon, and indexing means operated in timed relation with the faster moving conveyor and having a barrier for intercepting loaves and properly spacing them on the conveyor.

4. Bread handling apparatus for arranging loaves of bread received from a processing apparatus into a single line of spaced loaves comprising, in combination, a moving conveyor for supporting a plurality of bread loaves laterally thereof, a plurality of intermediate separate conveyors arranged in side-by-side relationship in alignment with and constituting a continuation of the first conveyor, means for driving at least one of said intermediate conveyors at a faster rate than another of said conveyors, means cooperating with the slower moving of said intermediate conveyors for directing loaves therefrom to the faster moving conveyor between successive loaves thereon, a third conveyor for receiving the aligned loaves from the higher speed intermediate conveyor, indexing means between the intermediate and third conveyors for intercepting loaves to properly space them one from the other, and means for driving the third conveyor at a higher rate of speed than the intermediate conveyor to increase the spacing between loaves.

5. A bread-handling apparatus for rearranging loaves of bread from a plural to a single-line relationship while being conveyed from one processing apparatus to another comprising, in combination, a moving conveyor for supporting a plurality of bread loaves in lateral side-by-side relationship as received from one processing apparatus, a second straight line conveyor in contiguous alignment with and forming a continuation of the first conveyor for receiving at least some of the loaves from the first conveyor, means for driving said second conveyor at a higher rate of speed than said first conveyor to space loaves received from the first conveyor, means cooperating with said second conveyor for directing others of the plurality of bread loaves on the first conveyor between the spaced loaves on the second conveyor to transpose them from a side-by-side relationship on the first conveyor into a single line of spaced loaves arranged lengthwise on the second conveyor, and a third conveyor movable in a direction transverse to the first and second conveyors, and means for propelling the loaves lengthwise from the second conveyor onto the transverse conveyor for movement sidewise thereon in a spaced single-lined relationship to another processing apparatus.

6. A bread-handling apparatus for rearranging loaves of bread from a side-by-side to an in line relationship while being conveyed from one processing apparatus to another comprising, in combination, a first conveyor belt of a width to support a plurality of loaves of bread in side-by-side relationship, a separate aligned conveyor belt located centrally of the first conveyor belt and mounted to move in the same direction, separate conveyor belts at each side of the central conveyor belt and extending beyond the latter, each of said side conveyor belts being of a width to support one loaf of bread arranged lengthwise thereof, means located centrally between the said first conveyor and said aligned central conveyor belts to direct at least one of a plurality of the loaves laterally onto one or the other of said side conveyor belts, means for driving the side belts at a speed relative to the first conveyor to space the loaves thereon a distance apart greater than the length of the loaves, means at the end of the centrally located belt for directing loaves laterally therefrom onto one or the other of the side belts between spaced loaves thereon, and means at each side of each side conveyor belt for aligning the loaves on the belt lengthwise thereon.

7. Bread-handling apparatus in accordance with claim 6 in which the means for directing the loaves laterally are a pair of friction discs arranged for rotation on vertical axes, and means for rotating the discs at high speed.

8. Bread-handling apparatus in accordance with claim 6 in which the means at each side of each belt for aligning the loaves are belts movable in vertical planes at each side of the conveyor belt, and means for driving said aligning belts at a speed at least equal to the speed of the conveyor belts.

9. Bread-handling apparatus in accordance with claim 6 in which the means for directing the loaves laterally are pairs of friction discs mounted for rotation on vertical axes, means for rotating said discs, the means for aligning the loaves on the conveyor belts comprising V-belts mounted on pulleys rotatable on vertical axes at each side of the conveyor belt, and means for driving the aligning belts at a speed greater than the conveyor belts.

10. Bread-handling apparatus in accordance with claim 6 in which an indexing means is provided at the ends of the side belts for intercepting and holding loaves to provide minimum spacing therebetween, and means for operating the indexing means in timed relation to the movement of the side conveyor belts.

11. Bread-handling apparatus in accordance with claim 6 in which separate conveyor belts are provided at the ends of each of said side conveyor belts, means for driving said last-named belts at a higher rate of speed than said conveyor belts, an indexing means operated in timed relation with the movement of said end conveyor belts for intercepting and holding loaves to insure a minimum spacing therebetween.

12. Bread-handling apparatus in accordance with claim 6 in which conveyor belts are arranged transversely of the direction of movement of said side conveyor belts, means for driving said transverse conveyor belts in opposite direction, conveyor belts between the side conveyor belts and transverse conveyor belts, and means for driving last-named conveyor belts at a high speed to propel successive bread loaves of a line onto the transverse conveyor belts.

13. Bread-handling apparatus in accordance with claim 12 in which the driving means for the transverse conveyor belts includes a reversing mechanism for driving each belt in either direction.

14. Bread-handling apparatus in accordance with claim 5 in which said directing means arranges the loaves in two separate lines of spaced loaves, separate transversely moving conveyor for each of said lines, and driving means for moving the separate transversely moving conveyors in opposite directions to deliver loaves of bread in the different lines to different processing apparatus.

15. Bread-handling apparatus in accordance with claim 14 in which the driving means includes a reversing mechanism for driving each of the separate transverse conveyors in either direction.

16. Apparatus for handling bakery products, comprising a supply conveyor moving at a first speed, a second conveyor moving at a higher second speed onto which a plurality of separate products advance, a pair of discs protruding above the surface of said second conveyor on opposite sides of the center line thereof, means for driving said discs in opposite directions to direct products outwardly, one of said discs being larger than the other to produce an unbalanced force on any product engaging both discs, three conveyors beyond said second conveyor and abreast of each other, the outer conveyors moving faster than the center conveyor, guide means tending to place the separate products lengthwise on the outer conveyor and lengthwise on each side of the center conveyor, and means at the far end of said three conveyors for directing products from the center conveyor to the side conveyors between spaced products thereon for forming two single lines of the product moving lengthwise.

17. The combination of elements as in claim 16 wherein said means for directing products from the center conveyor to the side conveyors includes inner and outer side guide belts moving faster than said outer conveyors.

18. A bread-handling apparatus for rearranging loaves of bread from a plural to a single-line relationship while being conveyed from one processing apparatus to another comprising, in combination, a moving conveyor for supporting a plurality of bread loaves in lateral side-by-side relationship as received from one processing apparatus, a second straight line conveyor in contiguous alignment with and forming a continuation of the first conveyor for receiving at least some of the loaves from the first conveyor, means for driving said second conveyor at a higher rate of speed than the first conveyor to space the loaves received from the first conveyor, means cooperating with said second conveyor for directing others of the plurality of bread loaves on the first conveyor between the spaced loaves on the second conveyor to transpose them from a side-by-side relationship on the first conveyor into a single line of spaced loaves arranged lengthwise on the second conveyor.

References Cited in the file of this patent

UNITED STATES PATENTS

| | | |
|---|---|---|
| 2,038,809 | Tallman | Apr. 28, 1936 |
| 2,242,531 | Marx | May 20, 1941 |
| 2,389,696 | Stiles | Nov. 27, 1945 |
| 2,403,673 | Mead | July 9, 1946 |
| 2,560,995 | Stiles | July 17, 1951 |
| 2,600,878 | Jensen | June 17, 1952 |
| 2,714,440 | Forty | Aug. 2, 1955 |
| 2,743,807 | McKune | May 1, 1956 |